United States Patent
Li et al.

(10) Patent No.: US 11,875,601 B2
(45) Date of Patent: Jan. 16, 2024

(54) MEME GENERATION METHOD, ELECTRONIC DEVICE AND STORAGE MEDIUM

(71) Applicant: Beijing Baidu Netcom Science and Technology Co., LTD, Beijing (CN)

(72) Inventors: Xin Li, Beijing (CN); Fu Li, Beijing (CN); Tianwei Lin, Beijing (CN); Henan Zhang, Beijing (CN)

(73) Assignee: Beijing Baidu Netcom Science and Technology Co., LTD, Beijing (CN)

( * ) Notice: Subject to any disclaimer, the term of this patent is extended or adjusted under 35 U.S.C. 154(b) by 238 days.

(21) Appl. No.: 17/382,582

(22) Filed: Jul. 22, 2021

(65) Prior Publication Data
US 2021/0350508 A1 Nov. 11, 2021

(30) Foreign Application Priority Data
Dec. 24, 2020 (CN) .......................... 202011556753.2

(51) Int. Cl.
*G06V 40/16* (2022.01)
*G06T 3/00* (2006.01)
(Continued)

(52) U.S. Cl.
CPC .......... *G06V 40/171* (2022.01); *G06F 18/214* (2023.01); *G06T 3/0075* (2013.01);
(Continued)

(58) Field of Classification Search
CPC .. G06V 40/171; G06V 10/757; G06V 40/165; G06V 40/174; G06F 18/214;
(Continued)

(56) References Cited

U.S. PATENT DOCUMENTS 10,572,720 B2* 2/2020 Hu .......................... G06T 17/00
11,295,115 B2* 4/2022 Wu ...................... G06V 10/757
(Continued)

FOREIGN PATENT DOCUMENTS

| CN | 111476709 A | 7/2020 |
|----|-------------|--------|
| CN | 111696185 A | 9/2020 |

(Continued)

OTHER PUBLICATIONS

Jiahao Geng et al: "Warp-guided GANs for single-photo facial animation", Dec. 4, 2018 (Dec. 4, 2018), pp. 1-12, XP058422618, DOI: 10.1145/3272127.3275043 ISBN: 978-1-4503-6008-1.
(Continued)

*Primary Examiner* — Phuoc Tran
(74) *Attorney, Agent, or Firm* — Banner Witcoff, Ltd.

(57) ABSTRACT

A meme generation method, an electronic device, and a storage medium are provided. The method includes: determining a plurality of second expression images corresponding to a target face image based on a plurality of first expression images contained in a first meme; generating a second meme corresponding to the target face image based on the plurality of second expression images corresponding to the target face image; wherein, determining an affine transformation parameter between the target face image and an i-th first expression image in the plurality of first expression images according to a corresponding relation between a face key point in the target face image and a face key point in the i-th first expression image; and transforming the target face image based on the affine transformation parameter to obtain an i-th second expression image corresponding to the target face image.

9 Claims, 3 Drawing Sheets (51) Int. Cl.
*G06T 5/00* (2006.01)
*G06F 18/214* (2023.01)
*G06V 10/75* (2022.01)

(52) U.S. Cl.
CPC ............ *G06T 5/005* (2013.01); *G06V 10/757* (2022.01); *G06V 40/165* (2022.01); *G06V 40/174* (2022.01)

(58) Field of Classification Search
CPC ..... G06F 3/0233; G06F 9/451; G06T 3/0075; G06T 5/005; G06T 13/80; G06T 13/40
See application file for complete search history.

(56) References Cited

U.S. PATENT DOCUMENTS

| | | | | |
|---|---|---|---|---|
| 11,645,798 | B1 * | 5/2023 | Demyanov | G06N 3/08 345/474 |
| 2017/0278302 | A1 * | 9/2017 | Varanasi | G06T 7/33 |
| 2020/0234482 | A1 | 7/2020 | Krokhalev et al. | |

FOREIGN PATENT DOCUMENTS

| | | |
|---|---|---|
| CN | 111768477 A | 10/2020 |
| CN | 111783658 A | 10/2020 |
| WO | 2019128508 A1 | 7/2019 |
| WO | 2019142127 A1 | 7/2019 |
| WO | 2020150689 A1 | 7/2020 |

OTHER PUBLICATIONS

Satoshi Iizuka et al: "Globally and locally consistent image completion", ACM Transactions on Graphics, CM, NY, US, vol. 36, No. 4, Jul. 20, 2017 (Jul. 20, 2017), pp. 1-14, XP058372881, ISSN: 0730-0301, DOI: 10.1145/3072959.3073659.
Jan. 26, 2022—(EP) EESR—App. No. 21189170.0.
Aug. 31, 2023—(CN) Office Action—App. No. 202011556753.2.
Hong Song, et al., Automatic Generation of Portraits with Multiple Expressions, Acta Electronica Sinica, vol. 41, No. 8, Aug. 15, 2013.
Bin Ding et al., Performance-driven 2D facial expression synthesis, Computer Engineering and Design, vol. 33 No. 8, Aug. 16, 2012.

* cited by examiner

MEME GENERATION METHOD, ELECTRONIC DEVICE AND STORAGE MEDIUM

CROSS-REFERENCE TO RELATED APPLICATION

This application claims priority to Chinese patent application No. 202011556753.2, filed on Dec. 24, 2020, which is hereby incorporated by reference in its entirety.

TECHNICAL FIELD

The present disclosure relates to the technical field of computers, in particular to the field of artificial intelligence, specifically, the fields of computer vision and deep learning.

BACKGROUND

With the continuous development of social intercourse and network, people's communication mode has gradually evolved from the earliest literal communication to communication by using symbols, images and memes, etc.

SUMMARY

The present disclosure provides a meme generation method, a meme generation apparatus, an electronic device and a storage medium.

According to an aspect of the present disclosure, a meme generation method is provided, including:
  determining a plurality of second expression images corresponding to a target face image based on a plurality of first expression images contained in a first meme;
  generating a second meme corresponding to the target face image based on the plurality of second expression images corresponding to the target face image;
  wherein the determining the plurality of second expression images corresponding to the target face image based on the plurality of first expression images contained in the first meme includes:
  determining an affine transformation parameter between the target face image and an i-th first expression image in the plurality of first expression images according to a corresponding relation between a face key point in the target face image and a face key point in the i-th first expression image, wherein i is a positive integer; and
  transforming the target face image based on the affine transformation parameter to obtain an i-th second expression image corresponding to the target face image.

According to another aspect of the present disclosure, a meme generation apparatus is provided, including:
  an image determination module configured for determining a plurality of second expression images corresponding to a target face image based on a plurality of first expression images contained in a first meme;
  a meme generation module configured for generating a second meme corresponding to the target face image based on the plurality of second expression images corresponding to the target face image,
  wherein the image determination module includes:
  a first parameter determination unit configured for determining an affine transformation parameter between the target face image and an i-th first expression image in the plurality of first expression images according to a corresponding relation between a face key point in the target face image and a face key point in the i-th first expression image, wherein i is a positive integer; and
  an image transformation unit configured for transforming the target face image based on the affine transformation parameter to obtain an i-th second expression image corresponding to the target face image.

According to another aspect of the present disclosure, an electronic device is provided, including:
  at least one processor; and
  a memory connected in communication with the at least one processor; wherein,
  the memory stores instructions executable by the at least one processor, and the instructions are executed by the at least one processor to enable the at least one processor to execute the method in any embodiment of the present disclosure.

According to another aspect of the present disclosure, a non-transitory computer-readable storage medium storing computer instructions is provided, wherein the computer instructions are configured for causing a computer to execute the method in any embodiment of the present disclosure.

According to another aspect of the present disclosure, a computer program product is provided, the computer program product including a computer program, when executed by a processor, implementing the method in any embodiment of the present disclosure.

It should be understood that the content described in this section is not intended to identify the key or important features of the embodiments of the present disclosure, and is not intended to limit the scope of the present disclosure. Other features of the present disclosure will be easily understood through the following description.

BRIEF DESCRIPTION OF THE DRAWINGS

The accompanying drawings are used to provide a better understanding of the solution and are not to be construed as limiting of the present disclosure, wherein.

DETAILED DESCRIPTION

Figure 1:
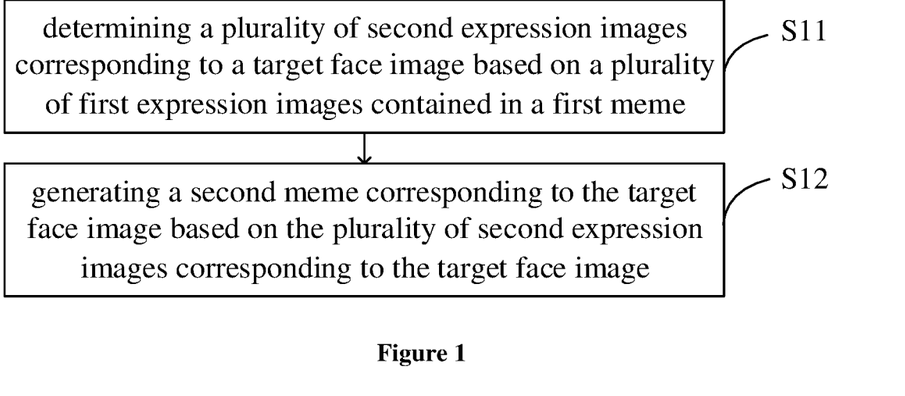
FIG. 1 is a schematic diagram of a meme generation method according to an embodiment of the present disclosure.

The exemplary embodiments of the present disclosure are described below in combination with the accompanying drawings, including various details of the embodiments of the present disclosure to facilitate understanding, which should be considered as exemplary only. Therefore, those of ordinary skill in the art should realize that various changes and modifications may be made to the embodiments described herein without departing from the scope and spirit of the present disclosure. Likewise, descriptions of well-known functions and structures are omitted in the following description for clarity and conciseness.

FIG. 1 illustrates a schematic diagram of a meme generation method provided by an embodiment of the present disclosure. As shown in FIG. 1, the method includes:

S11, determining a plurality of second expression images corresponding to a target face image based on a plurality of first expression images contained in a first meme; and S12, generating a second meme corresponding to the target face image based on the plurality of second expression images corresponding to the target face image.

Wherein, S11, determining the plurality of second expression images corresponding to the target face image based on the plurality of first expression images contained in the first meme includes:

determining an affine transformation parameter between the target face image and an i-th first expression image in the plurality of first expression images according to a corresponding relation between a face key point in the target face image and a face key point in the i-th first expression image, wherein i is a positive integer; and transforming the target face image based on the affine transformation parameter to obtain an i-th second expression image corresponding to the target face image.

It can be seen that, in the above method, the second meme is obtained based on the first meme and the target face image. Wherein, the first meme and the second meme may include a plurality of images corresponding to an expression of the same person or character visualization.

In an example, the plurality of expression images contained in the first meme or the second meme may be combined as a single dynamic expression file such as a GIF (Graphics Interchange Format) animation. Taking the first meme as an example, a plurality of first expression images therein are a plurality of images corresponding to a dynamic process for a certain person making an expression. The user may use the first meme to express the meaning as a whole. For example, the first meme is a dynamic expression file expressing "bye-bye," which contains a plurality of continuous images corresponding to a swing action of a certain person.

In another example, the plurality of expression images contained in the first meme or the second meme, respectively, may serve as different static expression files. Taking the first meme as an example, a plurality of first expression images therein may correspond to a plurality of expressions made by the same person. The user may select one expression image from the first meme and use the selected expression image to express the meaning. For example, the first meme includes a plurality of static expression files expressing a plurality of meanings such as "bye-bye," "thank you" and the like, wherein the static expression file expressing "bye-bye" is an image of swing of a certain person; and the static expression file expressing "thank you" is an image of bowing of the same person.

In the embodiment of the present disclosure, the second expression image may be obtained by processing the target face image based on each first expression image in the first meme.

Taking the i-th first expression image as an example, according to the above S11, the face key point in the target face image and the face key point in the i-th first expression image are first determined. Specifically, face key points may be respectively detected in the target face image and the i-th first expression image by using a face key point detection algorithm to obtain the position information, such as pixel coordinates, of the face key points.

There may be a plurality of face key points in each image, for example each image contains 5, 14, or 68 face key points. The plurality of face key points of the target face image correspond to a plurality of face key points in the i-th first expression image respectively. For example, the face key point for the left eye corner in the target face image corresponds to the face key point for the left eye corner in the i-th face image.

An affine transformation parameter may be determined by using the position information of a plurality of groups of corresponding face key points in the target face image and the i-th first expression image. Illustratively, the affine transformation parameter may be determined based on the position information of the face key points in the target face image and the position information of the corresponding face key points in the i-th first expression image. As an example, the relation between the affine transformation parameter A, the face key point (x', y') in the target face image and the corresponding face key point (x, y) in the i-th first expression image is as follows:

$$\begin{bmatrix} x \\ y \end{bmatrix} = A \begin{bmatrix} x' \\ y' \end{bmatrix}.$$

In practice, the affine transformation parameters may be vectors, matrices or other forms of parameters.

On the basis of an affine transformation parameter, an affine transformation may be performed on the target face image. For example, pixel coordinates (p, q) in the transformed image are calculated according to the affine transformation parameter and pixel coordinates (p', q') of at least part of pixel points in the target face image, and characteristic information, such as characteristic values, of the pixel points (p', q') is transferred into the pixel points (p, q) in the transformed image to obtain the transformed image, that is, the i-th second expression image.

It can be seen that, through affine transformation, the positions of the characteristic information of the target face image may be adjusted by referring to a first expression image in the first meme, the obtained second expression image has the characteristic information of the target face image, and the position distribution of the face key points in the second expression image is the same as or similar to the position distribution of the face key points in the first expression image. Based on this, the display effect of the second expression image is similar to the expression corresponding to the first expression image exhibited by the face in the target face image.

The plurality of expression images contained in the second meme may be obtained from the plurality of first expression images in the first meme, so that one or more expressions in the first meme are transferred into the second meme. Therefore, the above meme generation method may be applied to the following scenarios:

(1) A user A inputs a face image of a user B, and selects a set of GIF meme from a meme library as a first meme, wherein the GIF meme may include animations and static maps. The electronic device for executing the above method implements the transfer of the expression in the GIF meme into the face image of the user B and the output of the second meme based on the above method. The user A may use the second meme in the application program with the social function; for example, the second meme is sent to the user B, such that the social atmosphere is enlivened.

(2) The user A prefers the expression in a certain meme, but it is difficult for her/him to make an exaggerated action corresponding to the expression. The user A may transfer the expression into the image of the user A herself/himself by using the meme, to lower the threshold for manufacturing the expression.

(3) The user A records a short video to form a first meme, and may transfer the expression in the short video into face images of other people. For example, the short video for the user A singing is recorded, and the image of Einstein is used as a target face image, so that the Einstein sings following the user A.

It can be seen that, according to the method of the embodiment of the present disclosure, the second meme corresponding to the target face image may be automatically generated based on the first meme and the target face image. Based on this, the threshold for manufacturing the face meme may be lowered, the manpower and material costs for recording videos, professional image processing and the like during manufacturing are reduced, and meanwhile the efficiency of manufacturing the face meme is improved. Moreover, various memes meeting the personalized requirements of the users can be formed, facilitating to enliven the social atmosphere.

In an exemplary implementation, the affine transformation parameter between the target face image and the i-th first expression image may include an affine transformation matrix, and a global affine transformation is performed on the target face image based on the affine transformation matrix to obtain the i-th second expression image corresponding to the target face image.

In another exemplary implementation, the affine transformation parameter between the target face image and the i-th first expression image may include a plurality of local affine transformation matrices corresponding to a plurality of face key points in the target face image. Correspondingly, in S11, transforming the target face image based on the affine transformation parameter to obtain the i-th second expression image corresponding to the target face image includes:

respectively performing local affine transformation on a plurality of regions corresponding to the plurality of face key points in the target face image based on the plurality of local affine transformation matrices, to obtain the i-th second expression image corresponding to the target face image.

Illustratively, a plurality of face key points in the target face image may correspond one-to-one to a plurality of local affine transformation matrices. The plurality of regions corresponding to the plurality of face key points may include a peripheral region of each face key point in the plurality of face key points. The peripheral region may be a pixel region within a preset distance centered on the face key point, which includes for example a pixel point where the face key point is located and other pixel points within 10 or 100 pixels from the face key point.

According to the above implementation, based on the local affine transformation matrice respectively corresponding to each face key point, the local affine transformation is respectively performed on the region corresponding to each face key point, so that the affine transformation may be more accurate, and the obtained expression in the i-th second expression image may be more natural.

Figure 2:
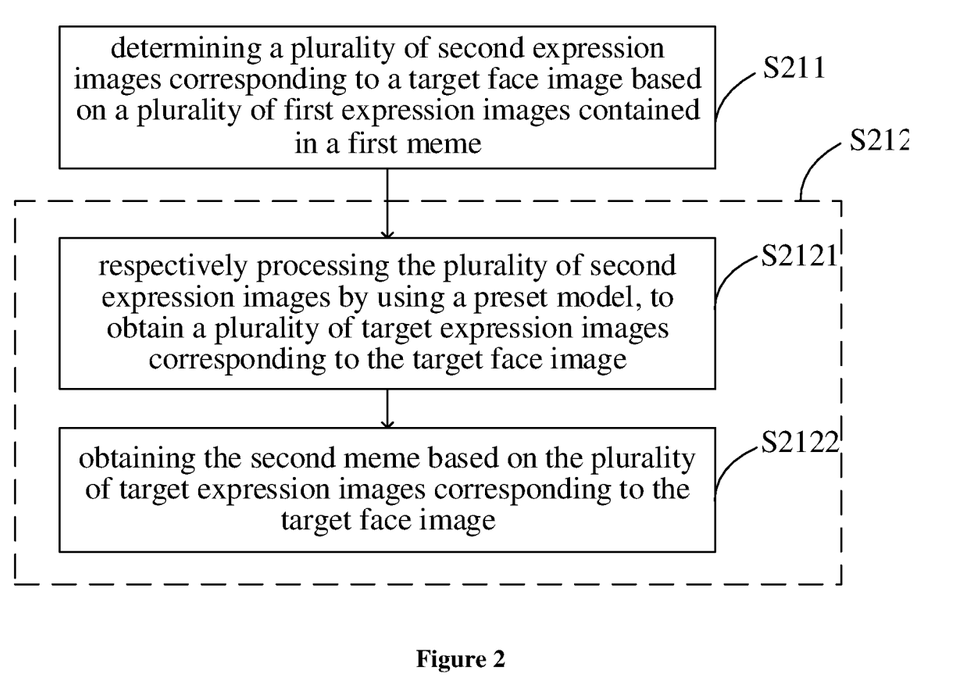
FIG. 2 is a schematic diagram of a meme generation method according to another embodiment of the present disclosure.

Illustratively, in the above method, second expression images may also be optimized by using a preset model. As shown in FIGS. 2, S211 and S212 are same as or similar to S11 and S12 in FIG. 1, respectively. The above S212, generating the second meme corresponding to the target face image based on the plurality of second expression images corresponding to the target face image includes:

S2121, respectively processing the plurality of second expression images by using a preset model, to obtain a plurality of target expression images corresponding to the target face image; and S2122, obtaining the second meme based on the plurality of target expression images corresponding to the target face image.

Wherein, the preset model may include, for example, a generative adversarial network (GAN), a total variation network (TV), etc. Wherein, the generative adversarial network may also be referred to as an adversarial generative network. The plurality of target expression images obtained based on the preset model may be combined to obtain a second meme.

An unnatural deformation may exist in the second expression image obtained based on the affine transformation or a gap may appear in the image due to the lack of characteristic information of part of pixel points. In the above implementation, for these issues, the second expression images may be optimized, and the second meme is obtained based on the target expression images obtained through optimization. Therefore, the expression corresponding to the second meme may be more natural and reality.

In practical applications, the optimization effect varies with the type of the preset model, the training mode of the preset model and the mode of using the preset model to process an image. In an exemplary implementation, the above S2121 may include:

respectively performing image inpainting on the plurality of second expression images by using a generative adversarial network, to obtain the plurality of target expression images corresponding to the target face image.

In the above implementation, for performing the image inpainting on second expression images by taking the generative adversarial network as a preset model, the image inpainting may be performed aiming at the problem that gaps exist in the image obtained through the affine transformation, so that the image in the second meme is complete, and the second meme is effectively optimized.

Illustratively, the meme generation method may further include:

performing training by using a plurality of third expression images contained in a third meme to obtain the preset model.

Wherein, a plurality of third memes may be obtained, and one or more parameter optimizations are performed on an initial model based on each third meme until the initial model converges to obtain the above preset model capable of optimizing the second expression images.

Because the preset model is configured for optimizing expression images in the second meme, performing model training by using the plurality of third expression images in the third meme may cause the target expression images obtained based on the preset model to better meet the requirements of the meme and improve the optimization effect.

Illustratively, the above performing training by using a plurality of third expression images contained in a third meme to obtain the preset model may include:

determining an affine transformation parameter between an n-th third expression image in the third meme and an m-th third expression image in the third meme according to a corresponding relation between a face key point in the n-th third expression image and a face key point in the m-th third expression image, wherein both n and m are positive integers;

transforming the n-th third expression image based on the affine transformation parameter to obtain an input sample image, and taking the m-th third expression image as an output sample image; and performing the training based on the input sample image and the output sample image to obtain the preset model.

For example, the n-th third expression image is an image A, the m-th third expression image is an image B, and the image A is transformed based on the affine transformation parameter between the image A and the image B to obtain an image C. Then, the model is trained by taking the image C as an input sample image for the preset model, taking the image B as an output sample image for the preset model, and taking the difference between the image output by the preset model and the image B as loss, so that the difference between the image output by the preset model and the image serving as a transformation target is minimized.

Because the n-th third expression image and the m-th third expression image belong to the same meme, the difference between the image obtained by transforming the n-th third expression image based on the affine transformation parameter between the both and the m-th third expression image mainly comes from the effect of the affine transformation, and the interference of other factors is eliminated. Therefore, the interference of other factors on the process for training the preset model is reduced, so that the process for training the preset model can focus on overcoming the defects existing in the optimization processing of the image, and the optimization effect of the expression images obtained through the affine transformation can be greatly improved.

Figure 3:
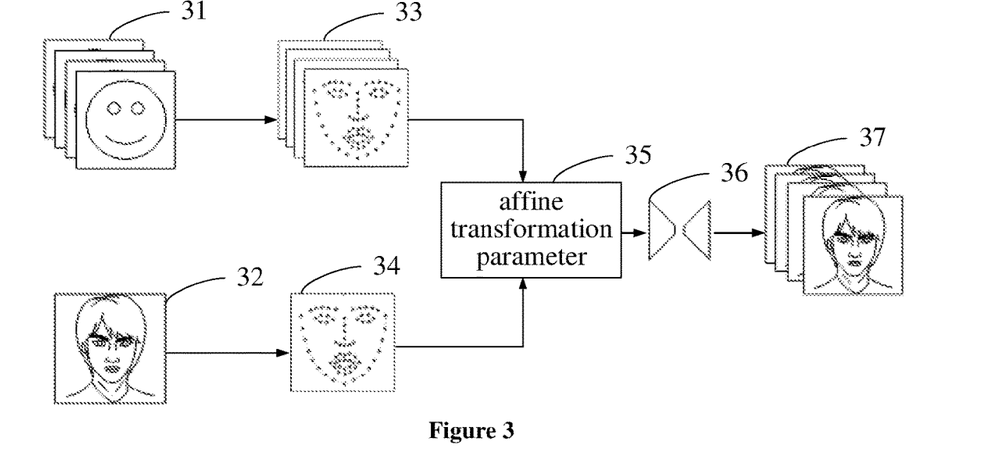
FIG. 3 is a schematic diagram of an application example of the meme generation method in an embodiment of the present disclosure.

FIG. 3 illustrates a complete application example of a meme generation method in an embodiment of the present disclosure.

As shown in FIG. 3, in the case where the first meme 31 and the face image 32 uploaded by a user are received, the face key points 33 in each of first expression images in the first meme 31 and the face key points 34 of the target face image are detected from each of the first expression images and the face image 32. The affine transformation parameter 35 corresponding to each first expression image are obtained based on the face key points 33 in each first expression image and the face key points 34 of the target face image. After the face image is transformed based on the affine change parameter 35, the transformed image is input into the generative adversarial network 36, and the generative adversarial network 36 performs optimization processing on the transformed image, such as inpainting gaps and the like, to obtain a plurality of target expression images. The second meme 37 is obtained based on the target expression images.

It can be seen that, according to the method of the embodiment of the present disclosure, the second meme corresponding to the target face image may be automatically generated based on the first meme and the target face image. Based on this, the threshold for manufacturing the face meme may be lowered, the manpower and material costs for recording videos, professional image processing and the like during manufacturing are reduced, and meanwhile the efficiency of manufacturing the face meme is improved. Moreover, various memes meeting the personalized requirements of the users can be formed, facilitating to enliven the social atmosphere.

Figure 4:
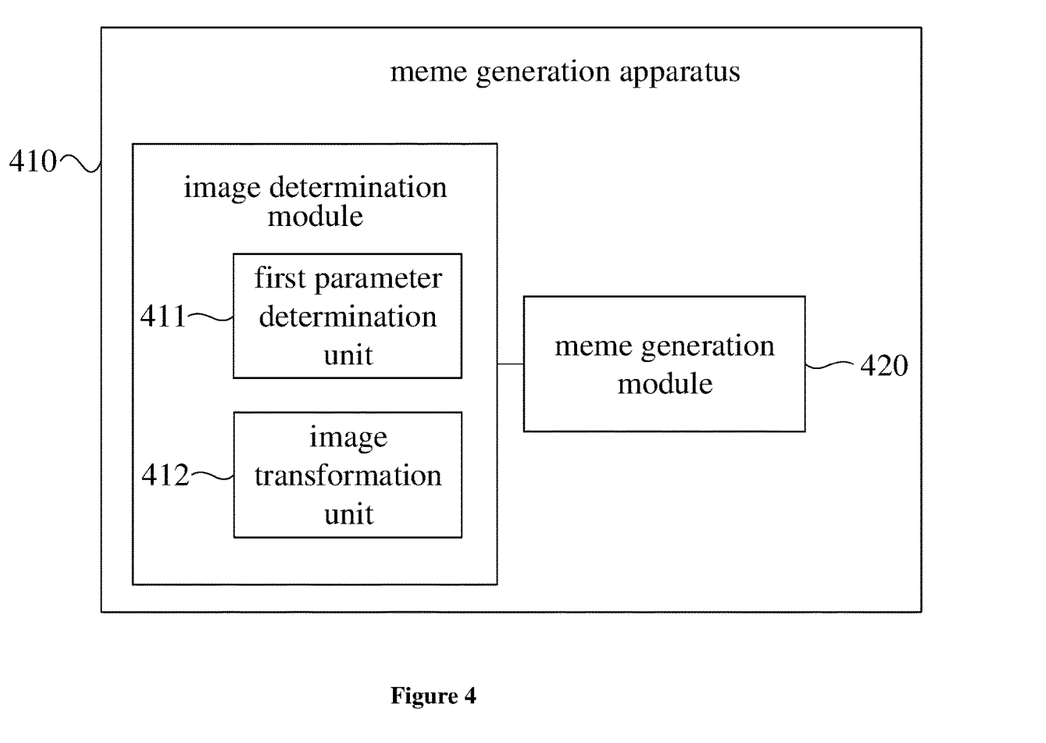
FIG. 4 is a schematic diagram of a meme generation apparatus according to an embodiment of the present disclosure.

As an implementation of the above method, the present disclosure also provides a meme generation apparatus. As shown in FIG. 4, the apparatus includes:

an image determination module 410 configured for determining a plurality of second expression images corresponding to a target face image based on a plurality of first expression images contained in a first meme;

a meme generation module 420 configured for generating a second meme corresponding to the target face image based on the plurality of second expression images corresponding to the target face image;

wherein the image determination module 410 includes:

a first parameter determination unit 411 configured for determining an affine transformation parameter between the target face image and an i-th first expression image in the plurality of first expression images according to a corresponding relation between a face key point in the target face image and a face key point in the i-th first expression image, wherein i is a positive integer; and an image transformation unit 412 configured for transforming the target face image based on the affine transformation parameter to obtain an i-th second expression image corresponding to the target face image.

Illustratively, the affine transformation parameter includes a plurality of local affine transformation matrices corresponding to a plurality of face key points in a target face image;

correspondingly, the image transformation unit 412 is further configured for:

respectively performing local affine transformation on a plurality of regions corresponding to the plurality of face key points in the target face image based on the plurality of local affine transformation matrices, to obtain the i-th second expression image corresponding to the target face image.

Figure 5:
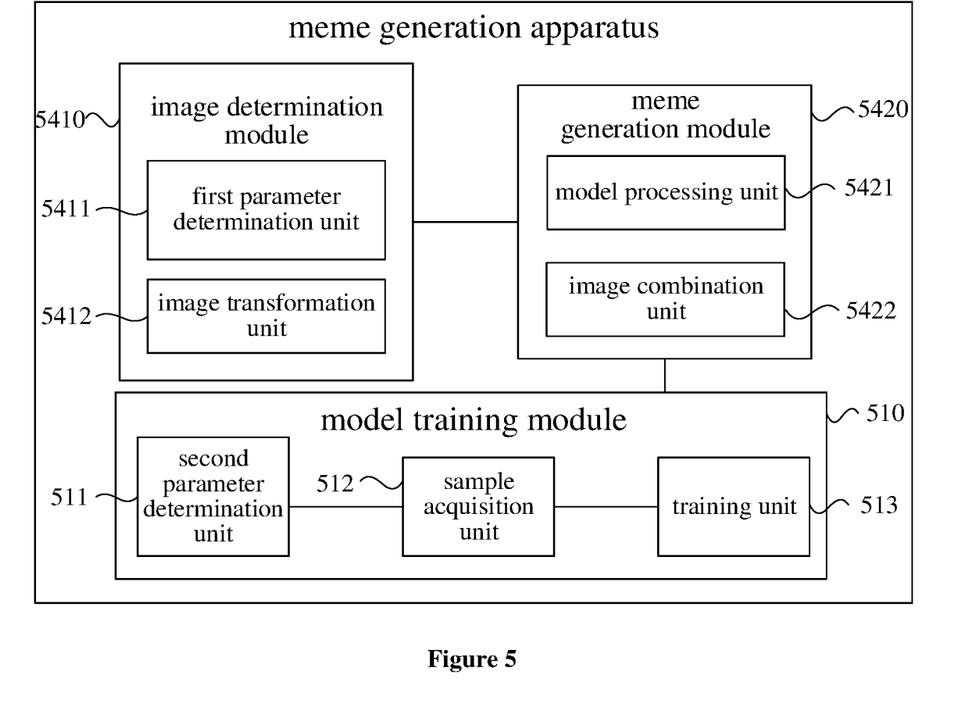
FIG. 5 is a schematic diagram of a meme generation apparatus according to another embodiment of the present disclosure.

Illustratively, as shown in FIG. 5, an image determination module 5410, a meme generation module 5420, a first parameter determination unit 5411, and an image transformation unit 5412 are same as or similar to the image determination module 410, the meme generation module 420, the first parameter determination unit 411, and the image transformation unit 412 in FIG. 4, respectively. The meme generation module 5420 includes:

a model processing unit 5421 configured for respectively processing the plurality of second expression images by using a preset model, to obtain a plurality of target expression images corresponding to the target face image; and an image combination unit 5422 configured for obtaining the second meme based on the plurality of target expression images corresponding to the target face image.

Illustratively, the model processing unit 5421 is further configured for:

respectively performing image inpainting on the plurality of second expression images by using a generative adversarial network, to obtain the plurality of target expression images corresponding to the target face image.

Illustratively, as shown in FIG. 5, the meme generation apparatus further includes:

a model training module 510 configured for performing training by using a plurality of third expression images contained in a third meme to obtain the preset model.

Illustratively, as shown in FIG. 5, the model training module 510 includes:

a second parameter determination unit 511 configured for determining an affine transformation parameter between an n-th third expression image in the third meme and an m-th third expression image in the third meme according to a corresponding relation between a face key point in the n-th third expression image and a face key point in the m-th third expression image, wherein both n and m are positive integers;

a sample acquisition unit 512 configured for transforming the n-th third expression image based on the affine transformation parameter to obtain an input sample image, and taking the m-th third expression image as an output sample image; and a training unit 513 configured for performing the training based on the input sample image and the output sample image to obtain the preset model.

According to embodiments of the present disclosure, the present disclosure also provides an electronic device, a readable storage medium, and a computer program product.

Figure 6:
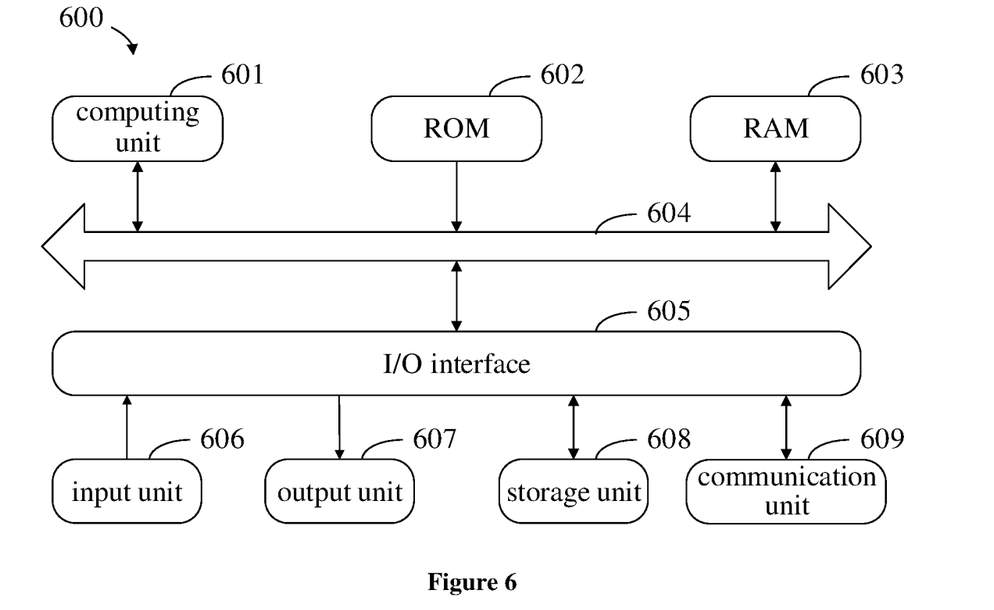
FIG. 6 is a block diagram of an electronic device used to implement the meme generation method of an embodiment of the present disclosure.

FIG. 6 illustrates a schematic block diagram of an exemplary electronic device 600 that may be used to implement embodiments of the present disclosure. The electronic device is intended to represent various forms of digital computers, such as laptop computers, desktop computers, workstations, personal digital assistants, servers, blade servers, mainframe computers, and other suitable computers. The electronic device may also represent various forms of mobile apparatuses, such as personal digital processing, cellular telephones, smart phones, wearable devices, and other similar computing apparatuses. The parts, connections and relations thereof, and functions thereof shown herein are merely examples and are not intended to limit the implementation of the present disclosure described and/or claimed herein.

As shown in FIG. 6, the electronic device 600 includes a computing unit 601 that may perform various suitable actions and processes in accordance with a computer program stored in a read-only memory (ROM) 602 or a computer program loaded from a storage unit 608 into a random access memory (RAM) 603. In the RAM 603, various programs and data required for the operation of the device 600 may also be stored. The computing unit 601, the ROM 602 and the RAM 603 are connected to each other via a bus 604. An input output (I/O) interface 605 is also connected to the bus 604.

A plurality of parts in the electronic device 600 are connected to an I/O interface 605, including: an input unit 606, such as a keyboard, a mouse, etc.; an output unit 607, such as various types of displays, speakers, etc.; a storage unit 608, such as a magnetic disk, an optical disk, etc.; and a communication unit 609, such as a network card, a modem, a wireless communication transceiver, etc. The communication unit 609 allows the electronic device 600 to exchange information/data with other devices via a computer network, such as the Internet, and/or various telecommunications networks.

The computing unit 601 may be a variety of general purpose and/or special purpose processing components having processing and computing capabilities. Some examples of the computing unit 601 include, but are not limited to, a central processing unit (CPU), a graphics processing unit (GPU), various specialized artificial intelligence (AI) computing chips, various computing units running machine learning model algorithms, a digital signal processor (DSP), and any suitable processor, controller, microcontroller, etc. The computing unit 601 performs various methods and processes described above, such as the meme generation method. For example, in some embodiments, the meme generation method may be implemented as a computer software program tangibly contained in a machine-readable medium, such as a storage unit 608. In some embodiments, part or all of the computer program may be loaded and/or installed on the electronic device 600 via the ROM 602 and/or the communication unit 609. When a computer program is loaded into the RAM 603 and executed by the computing unit 601, one or more steps of the above-described meme generation method may be performed. Alternatively, in other embodiments, the computing unit 601 may be configured to perform the meme generation method by any other suitable means (e.g., via firmware).

Various implementations of the systems and techniques described herein above may be implemented in a digital electronic circuit system, an integrated circuit system, a field programmable gate array (FPGA), an application specific integrated circuit (ASIC), an application specific standard product (ASSP), a system on chip (SOC), a load programmable logic device (CPLD), computer hardware, firmware, software, and/or combinations thereof. These various implementations may include: implementing in one or more computer programs, which may be executed and/or interpreted on a programmable system including at least one programmable processor. The programmable processor may be a dedicated or general-purpose programmable processor that may receive data and instructions from a storage system, at least one input device, and at least one output device, and transmit the data and instructions to the storage system, the at least one input device, and the at least one output device.

Program codes for implementing the methods of the present disclosure may be written in any combination of one or more programming languages. These program codes may be provided to processors or controllers of general purpose computers, special purpose computers, or other programmable data processing apparatuses, such that the program codes, when executed by the processors or the controllers, cause the functions/operations specified in the flowchart and/or block diagram to be implemented. The program codes may execute entirely on a machine, partly on a machine, partly on a machine as a stand-alone software package and partly on a remote machine or entirely on a remote machine or a server.

In the context of the present disclosure, a machine-readable medium may be a tangible medium that may contain or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of a machine-readable storage medium may include one or more wires-based electrical connections, a portable computer diskette, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination thereof.

In order to provide the interaction with a user, the system and technology described herein may be implemented on a computer that has: a display apparatus (e.g., a CRT (cathode ray tube) or an LCD (liquid crystal display) monitor) for displaying information to the user; and a keyboard and a pointing apparatus (e.g., a mouse or a trackball) through which the user may provide input to the computer. Other types of apparatuses may also be used to provide the interaction with a user: for example, the feedback provided to the user may be any form of sensory feedback (e.g., visual feedback, auditory feedback, or tactile feedback); and input from the user may be received in any form (including acoustic input, voice input, or tactile input).

The system and technology described herein may be implemented in a computing system (e.g., as a data server) that includes a background part, or be implemented in a computing system (e.g., an application server) that includes a middleware part, or be implemented in a computing system (e.g., a user computer having a graphical user interface or a web browser, through which a user may interact with implementations of the system and technology described herein) that includes a front-end part, or be implemented in a computing system that includes any combination of such background part, middleware part, or front-end part. The parts of the system may be interconnected by any form or medium of the digital data communication (e.g., a communication network). Examples of the communication network include: a Local Area Networks (LAN), a Wide Area Network (WAN), and the Internet.

A computer system may include a client and a server. The client and server are typically remote from each other and typically interact through a communication network. The relation of the client and the server is generated by computer programs running on respective computers and having a client-server relation with each other.

It should be understood that various forms of processes shown above may be used to reorder, add, or delete steps. For example, respective steps recorded in the present disclosure may be executed in parallel, or may be executed sequentially, or may be executed in a different order, so long as the desired result of the technical solution provided in the present disclosure can be achieved, no limitation is made herein.

The above-mentioned specific implementations do not constitute a limitation on the protection scope of the present disclosure. It should be understood by those skilled in the art that various modifications, combinations, sub-combinations and substitutions may be made according to design requirements and other factors. Any modification, equivalent replacement and improvement, and the like made within the spirit and principle of the present disclosure shall be included within the protection scope of the present disclosure.

What is claimed is:

1. A meme generation method, comprising:
   determining a plurality of second expression images corresponding to a target face image based on a plurality of first expression images contained in a first meme;
   generating a second meme corresponding to the target face image based on the plurality of second expression images corresponding to the target face image;
   wherein the determining the plurality of second expression images corresponding to the target face image based on the plurality of first expression images contained in the first meme comprises:
   determining an affine transformation parameter between the target face image and an i-th first expression image in the plurality of first expression images according to a corresponding relation between a face key point in the target face image and a face key point in the i-th first expression image, wherein i is a positive integer; and
   transforming the target face image based on the affine transformation parameter to obtain an i-th second expression image corresponding to the target face image,
   wherein the generating the second meme corresponding to the target face image based on the plurality of second expression images corresponding to the target face image comprises:
   respectively processing the plurality of second expression images by using a preset model, to obtain a plurality of target expression images corresponding to the target face image; and
   obtaining the second meme based on the plurality of target expression images corresponding to the target face image,
   wherein the method further comprises:
   performing training by using a plurality of third expression images contained in a third meme to obtain the preset model,
   wherein the performing the training by using the plurality of third expression images contained in the third meme to obtain the preset model comprises:
   determining an affine transformation parameter between an n-th third expression image in the third meme and an m-th third expression image in the third meme according to a corresponding relation between a face key point in the n-th third expression image and a face key point in the m-th third expression image, wherein both n and m are positive integers;
   transforming the n-th third expression image based on the affine transformation parameter to obtain an input sample image, and taking the m-th third expression image as an output sample image; and
   performing the training based on the input sample image and the output sample image to obtain the preset model.

2. The method of claim 1, wherein the affine transformation parameter comprises a plurality of local affine transformation matrices corresponding to a plurality of face key points in the target face image; and
   correspondingly, the transforming the target face image based on the affine transformation parameter to obtain the i-th second expression image corresponding to the target face image comprises:
   respectively performing local affine transformation on a plurality of regions corresponding to the plurality of face key points in the target face image based on the plurality of local affine transformation matrices, to obtain the i-th second expression image corresponding to the target face image.

3. The method of claim 1, wherein the respectively processing the plurality of second expression images by using the preset model, to obtain the plurality of target expression images corresponding to the target face image, comprises:
   respectively performing image inpainting on the plurality of second expression images by using a generative adversarial network, to obtain the plurality of target expression images corresponding to the target face image.

4. An electronic device, wherein the electronic device comprises:
   at least one processor; and
   a memory connected in communication with the at least one processor; wherein,
   the memory stores instructions executable by the at least one processor, and the instructions are executed by the at least one processor to enable the at least one processor to perform operations of:

determining a plurality of second expression images corresponding to a target face image based on a plurality of first expression images contained in a first meme;

generating a second meme corresponding to the target face image based on the plurality of second expression images corresponding to the target face image;

wherein the determining the plurality of second expression images corresponding to the target face image based on the plurality of first expression images contained in the first meme comprises:

determining an affine transformation parameter between the target face image and an i-th first expression image in the plurality of first expression images according to a corresponding relation between a face key point in the target face image and a face key point in the i-th first expression image, wherein i is a positive integer; and transforming the target face image based on the affine transformation parameter to obtain an i-th second expression image corresponding to the target face image, wherein the generating the second meme corresponding to the target face image based on the plurality of second expression images corresponding to the target face image comprises:

respectively processing the plurality of second expression images by using a preset model, to obtain a plurality of target expression images corresponding to the target face image; and obtaining the second meme based on the plurality of target expression images corresponding to the target face image, wherein the instructions are executed by the at least one processor to enable the at least one processor to further perform an operation of:

performing training by using a plurality of third expression images contained in a third meme to obtain the preset model, wherein the performing the training by using the plurality of third expression images contained in the third meme to obtain the preset model comprises:

determining an affine transformation parameter between an n-th third expression image in the third meme and an m-th third expression image in the third meme according to a corresponding relation between a face key point in the n-th third expression image and a face key point in the m-th third expression image, wherein both n and m are positive integers;

transforming the n-th third expression image based on the affine transformation parameter to obtain an input sample image, and taking the m-th third expression image as an output sample image; and performing the training based on the input sample image and the output sample image to obtain the preset model.

5. The electronic device of claim 4, wherein the affine transformation parameter comprises a plurality of local affine transformation matrices corresponding to a plurality of face key points in the target face image; and correspondingly, the transforming the target face image based on the affine transformation parameter to obtain the i-th second expression image corresponding to the target face image comprises:

respectively performing local affine transformation on a plurality of regions corresponding to the plurality of face key points in the target face image based on the plurality of local affine transformation matrices, to obtain the i-th second expression image corresponding to the target face image.

6. The electronic device of claim 4, wherein the respectively processing the plurality of second expression images by using the preset model, to obtain the plurality of target expression images corresponding to the target face image, comprises:

respectively performing image inpainting on the plurality of second expression images by using a generative adversarial network, to obtain the plurality of target expression images corresponding to the target face image.

7. A non-transitory computer-readable storage medium storing computer instructions, wherein the computer instructions are configured for causing a computer to perform operations of:

determining a plurality of second expression images corresponding to a target face image based on a plurality of first expression images contained in a first meme;

generating a second meme corresponding to the target face image based on the plurality of second expression images corresponding to the target face image;

wherein the determining the plurality of second expression images corresponding to the target face image based on the plurality of first expression images contained in the first meme comprises:

determining an affine transformation parameter between the target face image and an i-th first expression image in the plurality of first expression images according to a corresponding relation between a face key point in the target face image and a face key point in the i-th first expression image, wherein i is a positive integer; and transforming the target face image based on the affine transformation parameter to obtain an i-th second expression image corresponding to the target face image, wherein the generating the second meme corresponding to the target face image based on the plurality of second expression images corresponding to the target face image comprises:

respectively processing the plurality of second expression images by using a preset model, to obtain a plurality of target expression images corresponding to the target face image; and obtaining the second meme based on the plurality of target expression images corresponding to the target face image, wherein the computer instructions are further configured for causing the computer to perform an operation of:

performing training by using a plurality of third expression images contained in a third meme to obtain the preset model, wherein the performing the training by using the plurality of third expression images contained in the third meme to obtain the preset model comprises:

determining an affine transformation parameter between an n-th third expression image in the third meme and an m-th third expression image in the third meme according to a corresponding relation between a face key point in the n-th third expression image and a face key point in the m-th third expression image, wherein both n and m are positive integers;

transforming the n-th third expression image based on the affine transformation parameter to obtain an input sample image, and taking the m-th third expression image as an output sample image; and performing the training based on the input sample image and the output sample image to obtain the preset model.

8. The non-transitory computer-readable storage medium of claim 7, wherein the affine transformation parameter comprises a plurality of local affine transformation matrices corresponding to a plurality of face key points in the target face image; and correspondingly, the transforming the target face image based on the affine transformation parameter to obtain the i-th second expression image corresponding to the target face image comprises:

respectively performing local affine transformation on a plurality of regions corresponding to the plurality of face key points in the target face image based on the plurality of local affine transformation matrices, to obtain the i-th second expression image corresponding to the target face image.

9. The non-transitory computer-readable storage medium of claim 7, wherein the respectively processing the plurality of second expression images by using the preset model, to obtain the plurality of target expression images corresponding to the target face image, comprises:

respectively performing image inpainting on the plurality of second expression images by using a generative adversarial network, to obtain the plurality of target expression images corresponding to the target face image.

* * * * *